3,574,180
PROCESS FOR SEPARATING STARCH AND PROTEIN FROM WHEAT FLOUR WHEREIN THE FLOUR IS AGITATED WITH WATER AND $NH_4OH$ AND CENTRIFUGATION IS APPLIED TO THE RESULTING SLURRY

Philip H. Johnston, San Lorenzo, and David A. Fellers, El Cerrito, Calif., assignors to the United States of America as represented by the Secretary of Agriculture
No Drawing. Filed Apr. 23, 1968, Ser. No. 723,610
Int. Cl. A23j 1/12
U.S. Cl. 260—112                                4 Claims

ABSTRACT OF THE DISCLOSURE

Procedure for separating the starch and protein components of wheat flour wherein the flour is agitated with water and ammonium hydroxide and centrifugation is applied to the resulting slurry.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for separating the starch and protein components of wheat flour. Further objects of the invention will be evident from the following description wherein parts and percentages are by weight unless otherwise specified.

It is well known that wheat flour contains valuable proteins plus various other components, primarily starch. For certain purposes it is desirable to treat the flour to obtain compositions which contain an increased proportion of protein. Such procedures are generally cumbersome because of the tendency of the flour to form sticky, coherent masses or doughs when incorporated with water and subjected to such manipulations as centrifugation.

By application of the process of the invention this stickiness or coherence problem is obviated with the result that the protein and starch components can be effectively separated.

A particular advantage of the invention is that coherence and stickiness are obviated by the use of an agent, ammonium hydroxide, which is volatile and therefore readily removable from the products. In contrast, various agents which have been advocated for the purpose—e.g., lime, sodium hydroxide, salt, malt extract, etc.—are non-volatile substances which necessarily remain in the final products. A particular disadvantage in using a fixed alkali such as potassium or sodium hydroxide is that this base causes a modification or denaturation of the protein (gluten) component whereby it cannot be used in bakery products. Ammonium hydroxide, on the other hand, does not cause this difficulty—the protein recovered by the process of the invention retains its native or vital qualities, so that it can be added to doughs for bakery products without causing any adverse effects such as diminished loaf volume.

In a practice of the invention a mixture of wheat flour, water, and ammonium hydroxide is formed and subjected to agitation or shear forces to form a smooth slurry. In preparing the slurry, one generally uses about 1 to 2 parts of water per part of flour. For flours derived from hard wheats (high protein) a preferred ratio is about 1.5 parts of water per part of flour. For flours derived from soft wheats (low protein), a preferred ratio is about 1.25 parts of water per part of flour. Enough ammonium hydroxide (or ammonia gas) is added to the mixture to provide a pH of about 6.5 to 9.5, preferably 7.5 to 9.0. It may be noted that without addition of $NH_4OH$, the slurry will generally have a pH of about 5.8–6.0. The slurry is ordinarily prepared at room temperature (25° C.) as being convenient and giving excellent results; however, temperatures somewhat lower or higher—e.g., 15 to 45° C.—may be used if desired.

Having prepared the slurry of water, flour, and $NH_4OH$, this slurry is subjected to centrifugation whereby there is formed a dense bottom phase and a supernatant liquid phase. The bottom phase contains essentially all the prime starch from the flour in almost a pure state. This prime starch phase being in a granular condition, completely free from stickiness, can be readily separated from the remainder of the system, and can be readily processed as by washing with water and drying to prepare a high-grade starch for any desired use. Any ammonium hydroxide remaining in the starch fraction will, of course, be vaporized when the starch is dried. Essentially all the protein from the flour is contained in the liquidous supernatant. Since this phase is free from stickiness and gumminess, it pours readily and thus can be easily removed from the starch phase. The supernatant liquid is dried to produce a protein product useful for many purposes—for example, as a protein supplement in bread or other foods, as an additive for mixed animal feeds, as a base for preparing milk-like beverages, etc. It is obvious that during the drying step ammonium hydroxide is vaporized so that the protein product has its native properties.

The process of the invention may be applied to flours prepared from any varieties of wheat. However, it is of especial advantage in application to flours derived from hard (high-protein) wheats since these are especially prone to form sticky, coherent or dough-like masses when slurried with water.

The invention is further demonstrated by the following illustrative examples.

EXAMPLE 1

The starting material was a hard red spring, straight-run, unbleached flour having a protein content of 14.25% (measured on the un-dried basis, moisture content was 13.3%).

A mixture was made of 1250 g. of the flour, 2031 g. of water, and enough ammonium hydroxide to provide a pH of 8.0. The mixture was blended for 10 minutes in a 1-gallon capacity Waring Blendor. The resulting smooth, easily-pourable slurry was then centrifuged for 5 minutes at 1500 r.p.m. (about 500 g.). It was observed that there was formed a compact starch phase and a supernatant liquid phase. No problem with stickiness or coherence was encountered; the supernatant could be easily poured off the lower starch phase.

The supernatant liquid was freeze-dried to a moisture content of 2.15%. A yield of 498 g. of protein concentrate was obtained. Analysis indicated a protein content of 38.5% on a dry basis.

The starch fraction was freeze-dried without washing. A yield of 720 g. of starch was obtained. Analysis indicated it contained only 0.96% protein, on a dry basis.

EXAMPLE 2

A series of runs were made similar to those of Example 1 except that the amount of ammonium hydroxide added to the slurry was varied, and in one instance (control run) no ammonium hydroxide was added at all.

In each run the flour was derived from hard red spring wheat. The water to flour ratio was 1.625 to 1. The slurry was at 30° C. and blended for 3 minutes, then centrifuged for 5 minutes at 1500 r.p.m.

The viscosity of the slurry was measured in each case. Also, the handling character (pourability) of the supernatant after centrifugation was observed.

The results obtained are tabulated below.

| Run | pH of slurry | Viscosity (Brookfield) of slurry, centipoises | Pourability of supernatant |
|---|---|---|---|
| Control | 5.9 | 3,540 | Thick, glutinous, difficult to pour. |
| 1 | 6.52 | 3,415 | Thick, but better than control. |
| 2 | 7.0 | 3,150 | Slightly thick, but pourable. |
| 3 | 7.5 | 3,000 | Do. |
| 4 | 8.0 | 2,950 | Smooth, excellent pouring quality. |
| 5 | 8.5 | 2,925 | Do. |
| 6 | 9.0 | 3,050 | Do. |
| 7 | 9.5 | 3,370 | Pours well but some clotting. |
| 8 | 10.0 | (1) | Gelled, could not get separation. |

1 Too thick to measure.

The starch fractions obtained in several of the runs were dried and analyzed for protein content. The results are as follows:

| Run | pH of slurry | Yield of starch, percent, dry basis | Protein in starch, percent, dry basis |
|---|---|---|---|
| 2 | 7.0 | 59 | 1.0 |
| 3 | 7.5 | 59 | 0.9 |
| 4 | 8.0 | 58 | 0.9 |
| 5 | 8.5 | 58 | 1.1 |
| 6 | 9.0 | 56.5 | 0.9 |

EXAMPLE 3

Baking tests

Loaves of bread were prepared by a standard procedure from (1) a low-protein base flour (10.3% protein) and (2) the base flour fortified with 8.5% (sufficient to increase the protein content to 12%) of the dried protein product prepared as described above in Example 1. The loaves made with the base flour alone had a volume of 653 ml., those made with the fortified flour had a volume of 717 ml. Moreover, it was calculated that the increased volume to be expected because of the increase in protein content would be only 712 ml.

Having thus described the invention, what is claimed is:

1. A method for separating the protein and starch components of wheat flour which consists of
  (a) forming a slurry consisting of wheat flour, water in a proportion of 1 to 2 parts thereof per part of flour, and ammonium hydroxide in an amount sufficient to provide a pH about from 7.5 to 9.0, the temperature of the slurry being about from 15 to 45° C.,
  (b) centrifuging the slurry to segregate a starch fraction and a protein-containing supernatant liquid fraction,
  (c) separating said fractions, and
  (d) drying said protein-containing supernatant liquid fraction to evaporate moisture and residual ammonium hydroxide therefrom.

2. The method of claim 1 wherein the flour is a high-protein flour.

3. The method of claim 1 wherein the separated starch fraction is dried to evaporate moisture and residual ammonium hydroxide.

4. The method of claim 1 wherein the flour is a high-protein flour, the ratio of water to flour is about 1.6 to 1 by weight, the pH of the slurry is about 7.5 to 9.0, the temperature of the slurry is about 25° C., and wherein the separated starch and supernatant fractions are dried to remove moisture and residual ammonium hydroxide.

References Cited

UNITED STATES PATENTS

| 2,431,417 | 11/1947 | Obey | 260—112X |
| 2,455,981 | 12/1948 | Dimler | 260—112X |
| 2,946,780 | 7/1960 | Barker et al. | 260—123.5 |
| 2,961,353 | 11/1960 | Carlson et al. | 127—67 |
| 2,891,045 | 6/1959 | Montgomery et al. | 260—112 |

WILLIAM H. SHORT, Primary Examiner

H. SCHAIN, Assistant Examiner

U.S. Cl. X.R.

99—2, 17; 127—67